United States Patent
Tsukasaki et al.

(10) Patent No.: US 6,972,940 B2
(45) Date of Patent: Dec. 6, 2005

(54) POWER SUPPLY PROTECTION CIRCUIT

(75) Inventors: Norikazu Tsukasaki, Takefu (JP); Mitsuo Kumano, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 297 days.

(21) Appl. No.: 10/417,198

(22) Filed: Apr. 17, 2003

(65) Prior Publication Data
US 2003/0218843 A1 Nov. 27, 2003

(30) Foreign Application Priority Data
Apr. 18, 2002 (JP) .............................. 2002-116428

(51) Int. Cl.[7] .............................................. H02H 3/20
(52) U.S. Cl. ....................................................... 361/90
(58) Field of Search ............... 361/90, 32, 56, 361/86

(56) References Cited

U.S. PATENT DOCUMENTS 3,146,358 A * 8/1964 Pratt ............................. 361/88
3,311,907 A * 3/1967 Teal ............................. 340/662
3,317,792 A * 5/1967 Sutherland ..................... 361/56
3,317,793 A * 5/1967 Peek et al. ..................... 361/79

FOREIGN PATENT DOCUMENTS

| JP | 63-66028 | 5/1988 |
| JP | 5-23747 | 3/1993 |
| JP | 5-70143 | 9/1993 |
| JP | 8-19167 | 1/1996 |

* cited by examiner

Primary Examiner—Brian Sircus
Assistant Examiner—Boris Benenson
(74) Attorney, Agent, or Firm—Wenderoth, Lind & Ponack, L.L.P.

(57) ABSTRACT

A power supply protection circuit for stopping a power supply to electrical equipments in case a normal power voltage is not outputted from a direct current power supply and an excess voltage or a reduced voltage is outputted. The power supply protection circuit according to the present invention is constituted of a power source line for supplying a direct current power, via relay contacts of a relay, to an electrical equipment, a first circuit for detecting an excess voltage and a reduced voltage, a second circuit, and a relay operation circuit.

2 Claims, 2 Drawing Sheets

POWER SUPPLY PROTECTION CIRCUIT

BACKGROUND OF THE INVENTION

The present invention relates to an operation of an electrical equipment by a direct current power supply and more particularly, to a power supply protection circuit to stop supplying a power to an electrical equipment in case a normal power voltage is not outputted from a direct current power supply.

PRIOR ART

When a voltage outputted from a direct current power source is increased for some reason or other and an excess voltage is applied to an electrical equipment, the electrical equipment operated by the direct current power supply can be damaged. Accordingly, to protect an electrical equipment from such an excess voltage, in prior arts, a power supply protection circuit is provided in an input path from a direct current power supply to an electrical equipment.

FIG. 2 is a circuit diagram showing one example of a conventional power supply protection circuit. In FIG. 2, a numeral 27 depicts a direct current power supply. A direct current electric power outputted from the direct current power supply 27 is supplied to a positive terminal 28 and a negative terminal 29 respectively, and thereafter, via a positive input terminal 38 and a negative input terminal 39, supplied to an electrical equipment 30.

A power source line 36, through which an electric potential of the positive terminal 28 is applied to the positive input terminal 38 of the electrical equipment 30, is provided with relay contacts 33a, 33b of a relay 33. Moreover, in FIG. 2, a numeral 32 depicts a Zener diode and numerals 34 and 35 depict transistors, respectively.

Referring to the circuit shown in FIG. 2, in case a power voltage outputted from the direct current power supply 27 is normal, the transistor 35 is in a state to be conducted, and an electric current is conducted over a coil of the relay 33 and the relay 33 is turned ON, whereby electric power is supplied to the electrical equipment 30 from the direct power supply 27.

On the other hand, in case a power voltage outputted from the direct current power supply 27 is increased to be an excess voltage, the Zener diode 32 is conducted in a reverse direction, and the transistor 34 becomes conductive while the transistor 35 becomes unconductive. Consequently, an electric current cannot be conducted over a coil of the relay 33. Thus, the relay contacts of the relay 33 are turned OFF, and a supply of electric power from the direct current power supply 27 to the electrical equipment 30 is suspended, whereby the electrical equipment 30 is protected from getting damaged.

Referring to the protection circuit shown in FIG. 2, in case an output voltage of a direct current power supply 27 is increased to be an excess voltage more than a predetermined voltage, the Zener diode 32 detects such a situation and makes the relay 33 OFF. However, the protection circuit shown in FIG. 2 is unable to deal with such a case that the output of the direct current power supply 27 becomes reduced below a predetermined normal power voltage.

In general, even when a power voltage of a direct current power supply is reduced, this gives bad affects to electrical equipments. Namely, if a power voltage is reduced, such an electrical equipment, e.g., as a TV receiving set tends to continue to operate displaying unstable video pictures, thus resulting in discomfort to viewers. Therefore, it is preferable, in such a case, that the operation of the TV receiving set is stopped immediately after a reduction of a power voltage of a direct current power supply

SUMMARY OF THE INVENTION

It is, therefore, an object of the present invention to provide a power supply protect circuit, which can stop supplying a power to an electrical equipment, not only in case a direct current power supply outputs an excess voltage but also in case a direct current power supply outputs a reduced voltage below a preset power voltage.

In order to solve the above problems, the power supply protection circuit according to the present invention is provided with:

a power source line to supply a direct current electric power outputted from a direct current power supply, via relay contacts of a relay, to an electrical equipment; a first and second circuits respectively connected to the power source line in a parallel relation with each other; and a relay operation circuit connected between the first and second circuits, wherein the first circuit is provided with a first semiconductor-switching element and a first excess voltage detecting element, and connected such that if the first excess voltage detecting element detects an excess voltage, the first semiconductor-switching element becomes unconductive, and that if the first excess voltage detecting element does not detect an excess voltage, the path between an input terminal and an output terminal of the first semiconductor switching element becomes conductive, and wherein the second circuit is provided with a second semiconductor switching element and a second excess voltage detecting element, and connected such that if the second excess voltage detecting element detects an excess voltage, the second semiconductor-switching element becomes conductive, and that if the second excess voltage detecting element does not detect an excess voltage, the second semiconductor switching element becomes unconductive, and wherein the relay operation circuit is connected with a coil making contact points of said relay ON in case electric current is conducted in the coil from one terminal to the other terminal, a third semiconductor-switching element to controlling the conduction of electric current through the coil, and a reduced voltage detecting element that becomes conductive in case of detecting a voltage exceeding a reduced voltage and becomes unconductive in case of detecting a voltage below a reduced voltage, and the third semiconductor-switching element, whose control terminal is connected to the output terminal of the first semiconductor switching element through the reduced voltage detecting element, is connected such that if the reduced voltage detecting element detects a voltage exceeding a reduced voltage, the third semiconductor element becomes conductive, and that if the second semiconductor switching element becomes conductive, the third semiconductor switching element becomes unconductive, and one terminal of the coil is connected to the output terminal of the first semiconductor switching element, and the other terminal of the coil is connected to an input terminal of the third semiconductor switching element.

In the power supply protection circuit according to the present invention, when a power voltage within a predetermined normal range is outputted from a direct current power supply, since the first excess voltage detecting element in the first circuit does not detect an excess voltage, and the first semiconductor detecting element becomes conductive. On the other hand, since the second excess voltage-detecting element in the second circuit does not detect an excess voltage, the second semiconductor-switching element becomes unconductive. And, in the relay operation circuit, since a power voltage exceeding a reduced voltage is applied, via the first semiconductor switching element, to the reduced voltage detecting element, the reduced voltage detecting element becomes conductive.

As a result, the third semiconductor switching element becomes conductive, so that an electric current, which is outputted from the direct current power supply, is conducted via the input terminal and the output terminal of the first semiconductor switching element, one terminal and the other terminal of the coil, and the third semiconductor switching element. Thus, an electric current is conducted over the coil, so that the relay contacts of the power source line can be turned ON, thereby permitting a direct current power supply to supply an electric power to an electrical equipment to operate it.

Next, when an excess voltage exceeding a certain voltage over than a normal voltage is outputted from a direct current power supply, the first excess voltage detecting element in the first circuit detects an excess voltage, and the first semiconductor-switching element becomes unconductive. On the other hand, the second excess voltage-detecting element in the second circuit detects an excess voltage, and the second semiconductor-switching element becomes conductive.

In the relay operation circuit, when the first semiconductor-switching element becomes unconductive and the second semiconductor-switching element becomes conductive, the third semiconductor-switching element becomes unconductive. As a result, an electric current cannot be conducted over the coil, and the relay contacts of the relay are turned OFF. Accordingly, the power source line is turned OFF, so that supplying an electric power to an electrical equipment by the direct current power supply is stopped.

Next, when a reduced voltage that is below a certain voltage less than a normal voltage is outputted from the direct current power supply, since the first excess voltage-detecting element in the first circuit does not detect an excess voltage, the first semiconductor-switching element becomes conductive, and on the other hand, the second excess voltage-detecting element in the second circuit does not detect an excess voltage, so that the second semiconductor-switching element becomes unconductive.

And, in the relay operation circuit, a reduced power voltage from the direct current power supply is applied, via the first semiconductor switching element, to the reduced voltage detecting element, the reduced voltage-detecting element becomes unconductive. Then, the third semiconductor-switching element becomes unconductive. Accordingly, an electric current cannot be conducted over the coil, so that the relay contacts of the relay are turned OFF. And the power source line is turned OFF, and supplying an electric power to an electrical equipment by the direct current power supply is stopped.

Thus, the power supply protection circuit according to the present invention can protect electrical equipments from damages due to both of an excess voltage and a reduced voltage.

In addition, transistors may be used as the above-described semiconductor-switching elements, thereby making the power source protect circuit simple and leading to reduction of manufacturing costs.

BRIEF DESCRIPTION OF THE DRAWINGS

The invention will now be described in greater detail with reference to the accompanying drawings.

DETAILED DESCRIPTION OF THE PREFERRED EMBODIMENTS

Figure 1:
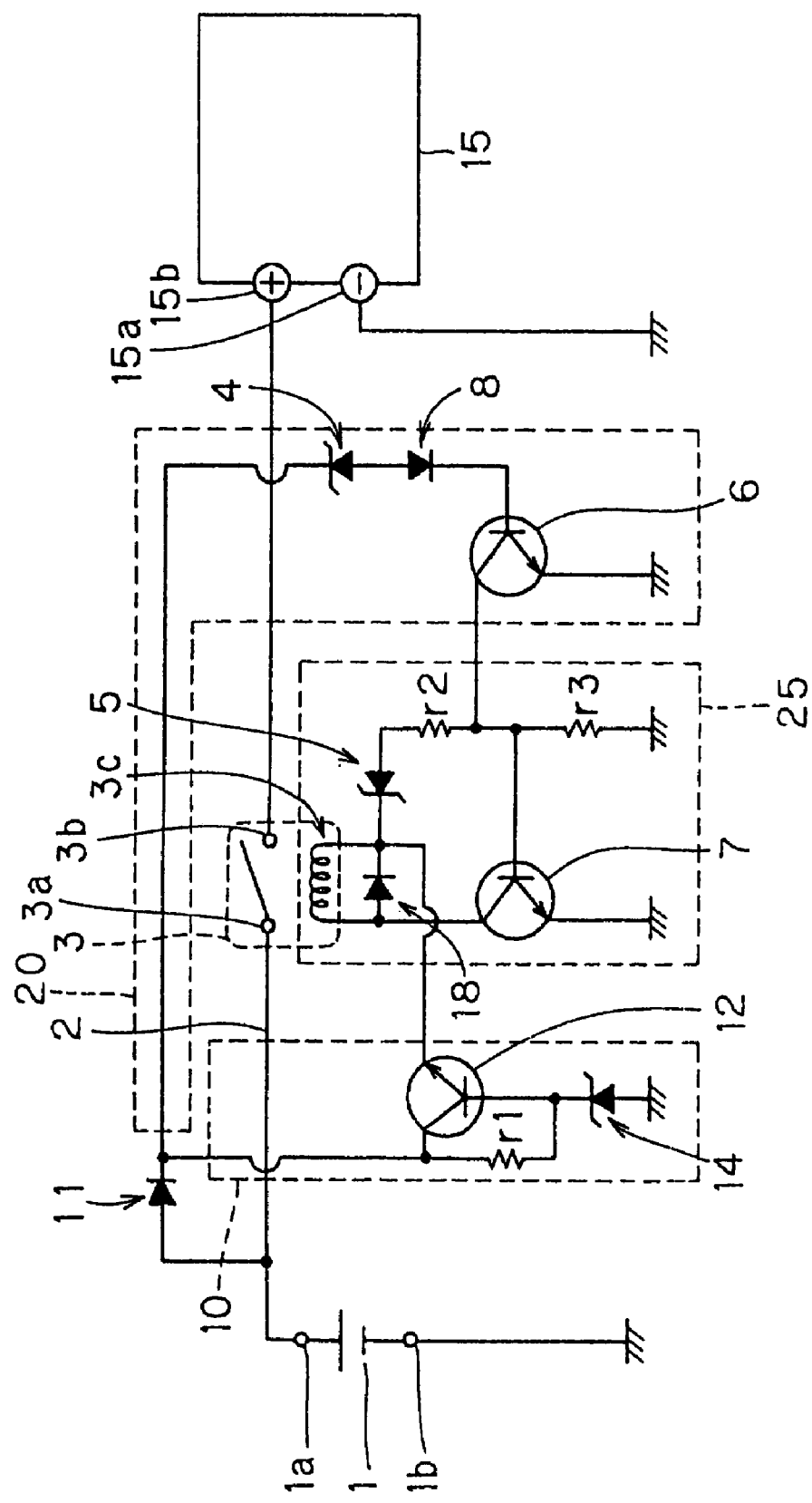
FIG. 1 is a circuit diagram showing a connection of the power supply protection circuit according to the present invention.
Figure 2:
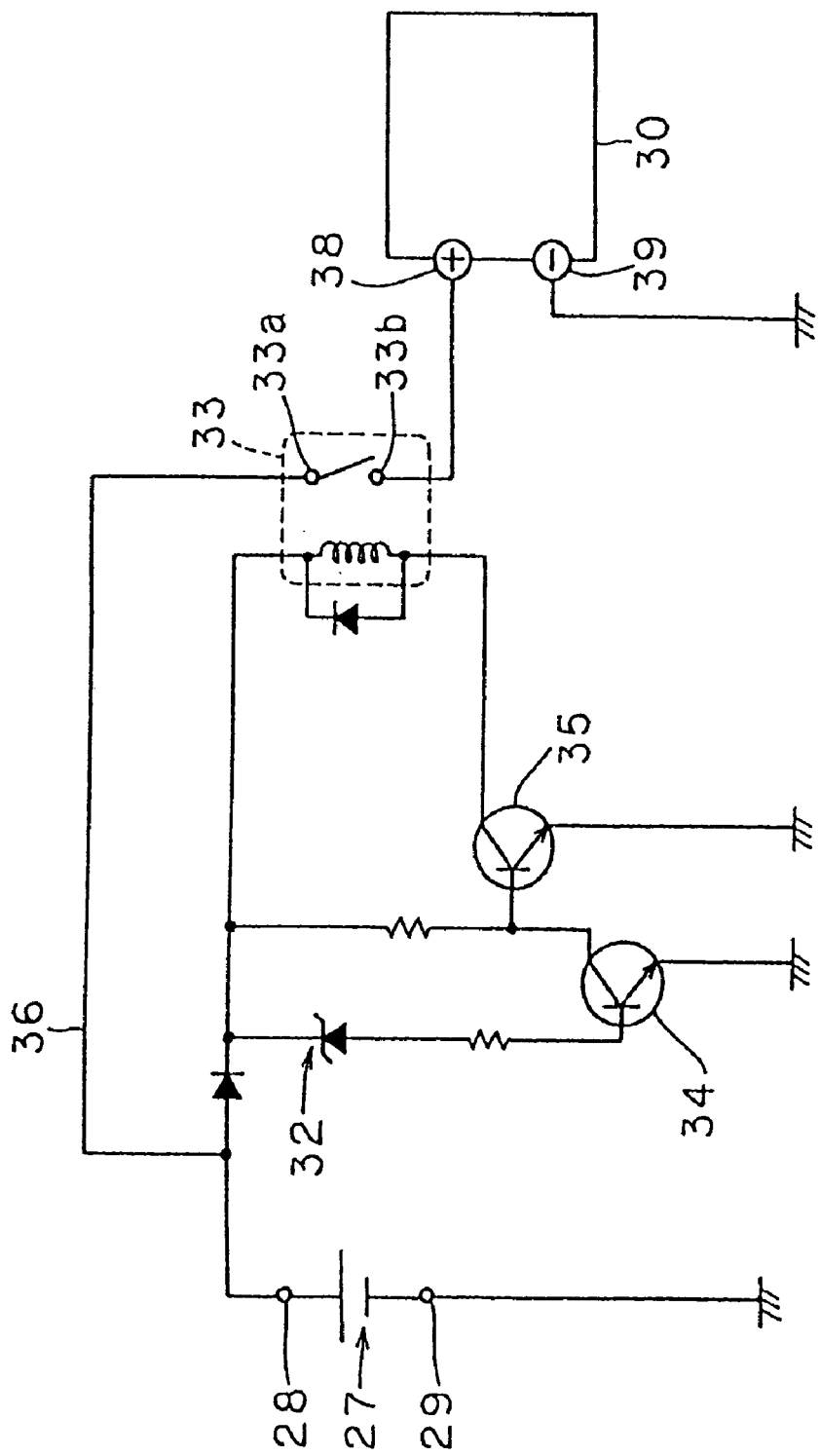
FIG. 2 is a circuit diagram showing one embodiment of a conventional power supply protection circuit.

In FIG. 1, a numeral 1 depicts a direct current power supply, and a numeral 15 depicts an electrical equipment that operates with a direct current electric power supplied by the direct current power supply. The power supply protection circuit according to the present invention is disposed between the direct current power supply 1 and the electrical equipment 15.

Direct current electric power from the direct current power supply 1 is supplied via a positive terminal 1a and a negative terminal 1b. Provided the direct current power supply 1 is attached to the positive terminal 1a and the negative terminal 1b without mistaking the polarity of positive and negative of the terminals, direct current electric power is outputted so that the positive terminal 1a gets positive potential relative to the negative terminal 1b. In this case, the negative terminal 1b is grounded. The direct current power supply 1, during a normal predetermined operation, outputs a normal power voltage with a power voltage V0.

The positive terminal 1a for the direct current power supply 1 is connected with a power source line 2 that supplies electric power outputted from the direct current power supply 1 to the electrical equipment 15. The positive power voltage of the direct current power supply 1, outputted from the positive terminal 1a, is applied, via the power source line 2, to the positive input terminal 15a of the electrical equipment 15. Also, the negative input terminal 15b of the electrical equipment 15 is grounded, and electric power from the direct current power supply 1 is supplied, via the power source line 2, to the electrical equipment 15.

In the midst of the power source line 2, relay contacts 3a, 3b of a relay 3 are provided, and the path between the relay contacts 3a, 3b is turned On or OFF by the operation of the relay 3, which will be explained hereunder. When the path between the relay contacts 3a, 3b is turned ON, the power source line 2 becomes conductive and direct current electric power is supplied to the electrical equipment 15. Likewise, when the path between the relay contacts 3a, 3b is turned OFF, the power source line 2 is broken and supplying an electric power to the electrical equipment 15 is suspended.

The positive terminal 1a for the direct current power supply 1 is connected with a diode 11 in a parallel relation with the power source line 2. The diode 11 is connected so that its anode is positioned on the side of the positive terminal 1a. The diode 11 is provided to protect the electrical equipment 15 in such a case that the direct current power supply 1 is attached to the positive terminal 1a and the negative terminal 1b by mistaking the polarity of positive and negative of the terminals.

A cathode of the diode 11 is connected with a first circuit 10 in a parallel relation with the power source line 2. And, the cathode of the diode 11 is connected with a second circuit 20 in a parallel relation with the power source line 2 and also with the first circuit 10.

The first circuit 10 is connected with a first transistor 12 and a Zener diode 14. The first transistor 12 is connected such that its collector terminal is connected with the cathode of the diode 11 and its base terminal is grounded via the Zener diode 14. And, the collector terminal and the base terminal of the first transistor 12 are connected via a resistor r1.

A cathode of the Zener diode 14 is connected to a base terminal of the transistor 12 and one terminal of the resistor r1, and an anode of the Zener diode 14 is grounded. When a power voltage exceeding the threshold power voltage value V1 is applied to the Zener diode 14 in a reverse direction, an electric current is conducted from the cathode side to the anode side.

In the Zener diode 14, the threshold power voltage V1 for a reverse direction of the Zener diode 14 is arranged to have a power voltage value (V0+α) in which a value (α) somewhat larger than an acceptable value for shifting towards a higher power voltage is added to a power voltage value V0 that is outputted from the direct current power supply 1 in a normal case. The Zener diode 14 can detect the aforesaid excess voltage through an electric current being conducted in a reverse direction. Thus, the Zener diode 14 operates as an excess voltage-detecting element.

The second circuit 20 is connected with a Zener diode 4, a diode 8, and a second transistor 6. A cathode of the Zener diode 4 is connected to a cathode of a diode 11, and an anode of the Zener diode 4 is connected, via the diode 8, to a base terminal of the second transistor 6. When a power voltage exceeding the threshold power voltage value V1 is applied to the Zener diode 4 in a reverse direction, an electric current can be conducted from the cathode side to the anode side.

In the Zener diode 4, the threshold power voltage V1 for a reverse direction of the Zener diode 4 is arranged to have a power voltage value (V0+α) in which a value (α) somewhat larger than an acceptable value for shifting towards a higher power voltage is added to a power voltage value V0 that is outputted from the direct current power supply 1 in a normal case. The Zener diode 4 can detect the aforesaid excess voltage through an electric current being conducted in a reverse direction. Thus, the Zener diode 4 operates as an excess voltage-detecting element.

The diode 8 is connected to the Zener diode 4 and a base terminal of the second transistor in series, and an anode of the diode 8 is connected with an anode of the Zener diode 4 so as to be in a forward direction for the positive terminal 1a. A base terminal of the second transistor 6 is connected to a cathode of the diode 8, and an emitter terminal of the second transistor 6 is grounded.

And, as shown in the circuit of the FIG. 1, a relay operation circuit 25 is connected between a first circuit 10 and a second circuit 20. The relay operation circuit 25 is connected with a coil 3c of the relay 3, a third transistor 7, and a Zener diode 5. One terminal of the coil 3c is connected to an emitter terminal of the transistor 12, and the other terminal is connected to a collector terminal of the third transistor 7. And, one terminal and the other terminal of the coil 3c are connected via a diode 18 disposed inside the relay 3. A cathode of the diode 18 is connected to one terminal of the coil 3c, and an anode of the diode 18 is connected to the other terminal of the coil 3c.

When an electric current is conducted over the coil 3c and thereafter the relay 3 operates, the path between the relay contacts 3a and 3c is turned ON. On the other hand, when an electric current is conducted over the coil 3c and the relay does not operate, the path between the relay contacts 3a and 3c is turned OFF.

A base terminal of the third transistor 7 is connected, via a circuit in which a Zener diode 5 and a resistor r2 are connected in series, to one terminal of the coil 3c, and a collector terminal of a third transistor 7 is connected to the other terminal of the coil 3c. A base terminal of the third transistor 7 is grounded via a resistor r3 and also connected to a collector terminal of a transistor 6.

The third transistor 7 controls the conduction of an electric current of the coil 3c. Namely, when the third transistor 7 becomes conductive, an electric current is conducted over the coil 3c, and when the third transistor 7 becomes unconductive, an electric current cannot be conducted over the coil 3c.

A cathode of the Zener diode 5 is connected to an emitter terminal of the transistor 12 and one terminal of the coil 3c, and an anode of the Zener diode 5 is connected to one terminal of the resistor r2. The other terminal of the resistor r2 is connected to a collector terminal of the transistor 6 and a base terminal of the transistor 7. When a power voltage over a threshold power voltage value V2 is applied to the Zener diode 5 in a reverse direction, an electric current can be conducted from the cathode side to the anode side.

In the Zener diode 5, the threshold power voltage V2 for a reverse direction of the Zener diode 5 is arranged to have a power voltage value (V0−β) in which a value (β) somewhat larger than an acceptable value for shifting towards a lower power voltage is subtracted from a power voltage value V0 that is outputted from the direct current power supply 1 in a normal case. The Zener diode 5 can detect a reduced voltage when electric current is not conducted in a reverse direction. Thus, the Zener diode 5 operates as a reduced voltage-detecting element.

The operation of the above-described power supply protection circuit is explained hereunder.

(1) In a Case where a Power Supply is Normally Operated:

First, the case where the direct current power supply 1 operates in a naturally expected manner and a power voltage V0 having a normal electric voltage within a normal range is outputted to the positive terminal 1a is explained.

When the power voltage V0 is outputted to the positive terminal 1a, the power voltage V0 is applied, passing through the diode 11 in a forward direction, to the first circuit 10 and the second circuit 20. An electric current from the direct current power supply 1, passing through the diode 11 in a forward direction, is supplied to the first circuit 10. In the first circuit 10, a power voltage applied to the Zener diode 14 in a reverse direction does not exceed the threshold power voltage value V1 for a reverse direction of the Zener diode 14, so that an electric current that passes through the Zener diode 14 in a reverse direction cannot be generated. Accordingly, a bias is given to a base terminal of the transistor 12, and the transistor 12 becomes conductive.

In addition, a bias for a base terminal of the transistor 12 is given to a collector terminal of the transistor 12 because of the existence of the resistor r1, so that an electric current inputted from a collector terminal of the transistor 12 is outputted from an emitter terminal of the transistor 12. And, a power voltage applied to the Zener diode 5 in a reverse direction exceeds the threshold power voltage value V2, so that an electric current can be conducted through the Zener diode 5 in a reverse direction. Thus, an electric current outputted from an emitter terminal of the transistor 12 is divided into two, namely, one current that is conducted through the coil 3c of the relay 3 and the other current that is conducted through the Zener diode 5 in a reverse direction.

The electric current conducted through the Zener diode 5 in a reverse direction flows into the ground via resistors r2 and r3. A bias voltage is given to a base terminal of the third transistor 7 by the resistor r3, and a bias voltage for a collector terminal against a base terminal is given by the resistor r3 in the third transistor 7, so that the third transistor 7 becomes conductive and is set to be in a state that electric current can be conducted from the collector terminal to the emitter terminal. Thus, an electric current that passes through one terminal and the other terminal of the coil 3c and passes through the collector terminal and the emitter terminal of the third transistor 7 and flows into ground is conducted.

As a result, an electric current is conducted through the coil 3c, so that the relay contacts 3a and 3b of the relay 3 are turned ON, and an electric power outputted from the direct current power supply 1 is supplied via the electric power line 2 to the electrical equipment 15, thereby allowing the electrical equipment 15 to be operated normally.

On the other hand, in the second circuit 20, the power voltage V0 that is applied through the diode 11 does not exceed the threshold power voltage value V1 for a reverse direction of the Zener diode 4, so that the Zener diode 4 cannot be conducted in a reverse direction. Thus, a bias voltage cannot be given to the base terminal of the second transistor 6, and the second transistor 6 is made unconductive, so that an electric current cannot be conducted through the second circuit 20.

(2) In a Case where an Excess Voltage is Outputted:

The case where a power voltage of the direct current power source 1 is increased for some reason or other and an excess power voltage is outputted is explained.

When an excess power voltage $V_H$ is outputted to the positive terminal 1a, the power voltage $V_H$ is applied, passing the diode 11 in a forward direction, to the first circuit 10 and the second circuit 20. An electric current from the direct current power supply 1, passing through the diode 11 in a forward direction, is inputted to the first circuit 10.

In the first circuit 10, the power voltage $V_H$ that is applied to the Zener diode 14 in a reverse direction exceeds the threshold power voltage value V1, so that an electric current is conducted through the Zener diode 4 in a reverse direction and flows into the ground. Accordingly, a bias voltage is not given to the base terminal of the first transistor 12, and the first transistor 12 becomes unconductive, so that an electric current from the transistor 12 to the coil 3c is not generated.

In the second circuit 20, the power voltage $V_H$, which passes through the diode 11 and is applied to the second circuit 20, exceeds the threshold power voltage value V1 for a reverse direction of the Zener diode 4, so that an electric current can be conducted through the Zener diode 4 in a reverse direction. Thus, a bias voltage is given to the base terminal of the second transistor 6, thereby making the second transistor 6 conductive.

And, in the second circuit 20, an electric current, which comes from the direct current power supply 1 and passes through the Zener diode 4 in a reverse direction and passes through the diode 8, the base terminal, and the emitter terminal of the second transistor 6 and flows into the ground, is generated. In this case, the second transistor 6 is set to be conductive and the emitter terminal is set to be of ground electric potential, so that the collector terminal is also made to be of ground electric potential. And, the base terminal of the third transistor 7, which is connected to the collector terminal of the second transistor 6, is set to be of ground electrical potential. Thus, the third transistor 7 does not become conductive, so that an electric current cannot be conducted through the coil 3c.

As explained above, when an excess power voltage is outputted from the direct current power supply 1, an electric current cannot be conducted through the coil 3c, and the path between the relay contacts 3a and 3b is turned OFF, thereby protecting the electrical equipment 15 from being applied by an excess power voltage outputted from the direct current power supply 1.

(3) In a Case where a Reduced Power Voltage is Outputted from a Direct Current Power Supply:

The case where the power voltage of the direct current power supply 1 is reduced for some reason or other and a reduced power voltage is outputted from the direct current power supply 1 is explained.

When a reduced power voltage $V_L$ is outputted to the positive terminal 1a, the power voltage $V_L$ is applied, via the diode 11 in a forward direction, to the first circuit 10 and the second circuit 20. In the first circuit 10, the power voltage $V_L$ applied to the Zener diode 14 does not exceed the threshold power voltage value V1 for a reverse direction of the Zener diode 14, so that an electric current cannot be conducted through the Zener diode 14 in a reverse direction. Accordingly, a bias voltage is given to the base terminal of the transistor 12, and the transistor 12 becomes conductive.

Thus, the power voltage $V_L$ that is applied to the collector terminal of the transistor 12 is outputted to the emitter terminal of the transistor 12, and the power voltage $V_L$ is applied to a Zener diode 5 in a reverse direction. Since the power voltage $V_L$ that is applied to the Zener diode 5 is less than the threshold power voltage value V2 for a reverse direction of the Zener diode 5, the Zener diode 5 cannot be conducted in a reverse direction. Accordingly, a bias voltage is not given to the base terminal of the transistor 7, thereby making the transistor 7 unconductive. An electric current cannot be conducted through the coil 3c and the path between the relay contacts 3a and 3b is turned OFF, so that the output power from the direct current power supply 1 is not supplied to the electrical equipment 15.

On the other hand, in the second circuit 20, the power voltage $V_L$ that is applied through the diode 11 does not exceed the threshold power voltage value V1 for a reverse direction of the Zener diode 4, so that the Zener diode 4 cannot be conducted in a reverse direction. Thus, a bias voltage is not given to the base terminal of the second transistor 6, thereby making the transistor 6 unconductive. An electric current cannot be conducted through the second circuit 20. As such, when a reduced power voltage is outputted, supplying an electric power to the electrical equipment 15 by the direct current power supply 1 is suspended.

In the power supply protection circuit according to the present invention as explained heretofore, the first transistor 12, the second transistor 6, and the third transistor 7 correspond to semiconductor switching elements, respectively. And, the base terminals of these transistors correspond to control terminals that control the conductive or unconductive state of these transistors according to the voltage input to those terminals. Further, the emitter terminals of the aforementioned transistors correspond to output terminals from which an electric current is outputted, and the collector terminals of the aforementioned transistors correspond to input terminals to which an electric current is inputted.

The aforementioned explanations with respect to transistors are based on NPN transistors, but PNP transistors may also be used. In case of using PNP transistors, same as the cases of NPN transistors, a base terminal, to which a signal for controlling the state of the transistors in a conductive state or in an unconductive state is inputted, corresponds to a control terminal, and in other remaining terminals, a terminal, to which an electric current is inputted, corresponds to an input terminal, and a terminal that outputs an electric current corresponds to an output terminal.

Further, as a semiconductor-switching element, a FET (Field-Effect Transistor) may be used. Also in this case, a gate terminal, to which a signal for controlling the state of the device in a conductive state or in an unconductive state is inputted, corresponds to a control terminals, and in other remaining terminals, i.e., a source terminal and a drain terminal, a terminal that outputs an electric current corresponds to an output terminal, and a terminal, to which an electric current is inputted, corresponds to an input terminal.

Semiconductor switching elements other than the above-mentioned concrete example may be provided with: a control terminal to which a signal for controlling the state of the device in a conductive state or in an unconductive state conductive state is inputted; an input terminal to which an electric current is inputted; and an output terminal that outputs an electric current. In this case, the path between the input terminal and the other terminal becomes conductive by a certain voltage input to the control terminal.

As for an electrical equipment to be operated with the combination of the power supply protection circuit according to the present invention, any electrical equipment that can be operated by a direct current power supply can be used. Yet, a direct current power supply that is combined with the power supply protection circuit according to the present invention can be used to an in-vehicle power supply of a vehicle. Accordingly, the power supply protection circuit according to the present invention can be combined with such as a TV operated by an in-vehicle power supply and other electrical equipments that can be operated by an in-vehicle power supply.

As explained heretofore, the power supply protection circuit according to the present invention can protect electrical equipments from being damaged by an excess voltage, and further can stop supplying a power to an electrical equipment for the case of a reduced voltage being outputted from a direct current power supply. Thus, when the power voltage of a direct current power supply is reduced, the operation of an electrical equipment can be stopped immediately, and a continuous inconvenience caused by a unstable operation under the abnormal condition can be avoided. For example, in a case of an electrical equipment such as a TV, there is the possibility that unstable video pictures continuously displayed would give discomfort to viewers in case a reduced voltage is supplied. However, by applying the power supply protection circuit according to the present invention, when a reduced voltage is outputted, supplying a power to an electrical equipment is suspended immediately, thereby solving inconvenience as above described.

In addition, the power supply protection circuit according to the present invention can avoid an increase of manufacturing costs, and can deal with both of an excess voltage and a reduced with the simple circuit constitution.

According to the present invention, as explained heretofore, both in the case when an excess voltage is outputted from a direct current power supply and in the case when a reduced voltage is outputted from a direct current power supply, supplying a power to an electrical equipment can be suspended. With such an arrangement, an electrical equipment can be protected from getting damaged by an excess voltage, and a continuous inconvenience caused by a unstable operation of an electrical equipment due to a reduced voltage can be solved.

What is claimed is:

1. A power supply protection circuit provided with:
   a power source line for supplying direct current electric power outputted from a direct current power supply, via relay contacts of a relay, to an electrical equipment; a first and second circuits respectively connected to said power source line in a parallel relation with each other; and a relay operation circuit connected between said first and second circuits,
   wherein said first circuit is provided with a first semiconductor-switching element and a first excess voltage detecting element, and connected such that if said first excess voltage detecting element detects an excess voltage, said first semiconductor-switching element becomes unconductive, and that if said first excess voltage detecting element does not detect an excess voltage, the path between an input terminal and an output terminal of said first semiconductor-switching element becomes conductive, and
   wherein said second circuit is provided with a second semiconductor switching element and a second excess voltage detecting element, and connected such that if said second excess voltage detecting element detects an excess voltage, said second semiconductor-switching element becomes conductive, and that if said second excess voltage detecting element does not detect an excess voltage, said second semiconductor-switching element becomes unconductive, and
   wherein said relay operation circuit is connected with a coil making relay contacts of said relay ON in case an electric current is conducted from one terminal to the other terminal in the coil, a third semiconductor-switching element for controlling conducting said electric current to said coil, and a reduced voltage detecting element that becomes conductive in case of detecting a voltage exceeding a reduced voltage and becomes unconductive in case of detecting a voltage below a reduced voltage, and said third semiconductor-switching element, whose control terminal is connected to the output terminal of said first semiconductor-switching element via said reduced voltage detecting element, is connected such that if said reduced voltage detecting element detects a voltage exceeding a reduced voltage, said third semiconductor-switching element becomes conductive, and that if said second semiconductor-switching element becomes conductive, said third semiconductor-switching element becomes unconductive, and one terminal of said coil is connected to an output terminal of said first semiconductor-switching element, and the other terminal of said coil is connected to an input terminal of said third semiconductor-switching element.

2. A power supply protection circuit claimed in claim 1, wherein said semiconductor-switching element is a transistor.

* * * * *